(12) United States Patent  
Ryan

(10) Patent No.: US 9,138,844 B2
(45) Date of Patent: Sep. 22, 2015

(54) PORTABLE ALARM SYSTEM FOR CNC MILLING MACHINE

(71) Applicant: Thomas F. Ryan, Littleton, CO (US)

(72) Inventor: Thomas F. Ryan, Littleton, CO (US)

(*) Notice: Subject to any disclaimer, the term of this patent is extended or adjusted under 35 U.S.C. 154(b) by 128 days.

(21) Appl. No.: 14/102,999

(22) Filed: Dec. 11, 2013

(65) Prior Publication Data

US 2015/0158135 A1   Jun. 11, 2015

(51) Int. Cl.
*G08B 21/00* (2006.01)
*B23Q 11/00* (2006.01)
*G08B 21/24* (2006.01)

(52) U.S. Cl.
CPC .............. *B23Q 11/00* (2013.01); *G08B 21/24* (2013.01)

(58) Field of Classification Search
CPC .............. G05B 19/4065; G05B 2219/50203; G01H 1/003; F04D 27/008; B23H 7/20
USPC ........................................................ 340/680
See application file for complete search history.

(56) References Cited

U.S. PATENT DOCUMENTS

| | | | |
|---|---|---|---|
| 4,473,883 A * | 9/1984 | Yoshida et al. | 700/179 |
| 4,973,944 A | 11/1990 | Maletta | |
| 5,148,053 A | 9/1992 | Dubois, III | |
| 5,486,691 A | 1/1996 | Dieterle | |
| 5,563,581 A | 10/1996 | Kats | |
| 5,579,884 A | 12/1996 | Appleyard et al. | |
| 5,898,379 A * | 4/1999 | Vanbergeijk | 340/680 |
| 6,717,514 B1 | 4/2004 | Stein et al. | |
| 7,252,466 B1 * | 8/2007 | Roch | 409/187 |
| 8,289,151 B2 | 10/2012 | Koennecke et al. | |

* cited by examiner

*Primary Examiner* — Steven Lim
*Assistant Examiner* — Omeed Alizada
(74) *Attorney, Agent, or Firm* — Edwin H. Crabtree; Ramon L. Pizarro

(57) ABSTRACT

An alarm system including a battery powered transmitter received in a watertight housing. The housing includes an outwardly extending shank. The shank is adapted for receipt in a tool holder stored in tool change magazine. The magazine is mounted inside a high speed CNC milling machine. When the milling machine completes a work cycle on a work piece, it is programmed to activate an automatic tool changer that retrieves the tool holder with transmitter from the magazine and attaches them to a tool spindle. The movement of the machine is then used to activate a radio signal button on the transmitter and send a radio frequency signal to a battery powered receiver disposed outside the milling machine. The receiver than activates an alarm. The operator is then alerted that the milling machine has stopped operating and needs to be attended.

15 Claims, 3 Drawing Sheets

PORTABLE ALARM SYSTEM FOR CNC MILLING MACHINE

BACKGROUND OF THE INVENTION (a) Field of the Invention

This invention relates to an alarm system for a machine tool and more particularly but not by way of limitation to a portable alarm system used with a CNC milling machine for alerting a machine operator that the milling of a particular work piece has been completed and the milling machine needs to be attended to and a new work cycle started.

(b) Discussion of Prior Art

Heretofore, there have been a number of patent applications filed on various types of audio and visual alarms used with milling machines for sounding an alarm related to a cutting fluid shortage, overheating of a machine tool or work piece, collisions of work pieces and moving of axes and tools. Also, in U.S. Pat. No. 6,717,514 to Stein et al., U.S. Pat. No. 5,579,884 to Appleyard et al, U.S. Pat. No. 5,563,581 to Kats, U.S. Pat. No. 5,486,691 to Dieterle, U.S. Pat. No. 5,148,053 to Dubois III, and U.S. Pat. No. 4,973,944 to Maletta, various types of machine tool safety devices, monitoring apparatus, and alarm devices are described for preventing operator injuries when using lathes, milling equipment, metal shears and the like.

None of the above mentioned prior art alarms have the particular unique features, objects and advantages of the subject portable alarm system used with a tool magazine and a CNC milling machine spindle.

SUMMARY OF THE INVENTION

In view of the foregoing, it is a primary objective of the subject invention to provide an audio alarm system or visual alarm system or a combination of both sent to an operator of a CNC milling machine when the milling of a work piece is completed. The benefit of the alarm system is a more efficient use of the machine and greater work piece productivity due to lack of machine downtime.

Another object of the invention is the alarm system is portable with a system transmitter moveable from one machine to the next. Also, a system receiver can be moved from location to location near the milling machine for ease in hearing or seeing the alarm.

Yet another object of the invention is the portable transmitter includes a watertight housing with an outwardly extending shank adapted for attachment to a standard tool holder. The tool holder is removably stored in a tool magazine or attached to a tool spindle.

The alarm system includes a battery powered transmitter received in a watertight housing. The housing includes an outwardly extending shank. The shank is adapted for receipt in a tool holder. The tool holder is stored in a pot on a rotating tool change magazine. The tool change magazine is mounted inside a high speed CNC milling machine and away from the hostile environment of the machining of a work piece. When the milling machine completes a work cycle on the work piece, it is programmed to activate an automatic tool changer that retrieves the transmitter and tool holder from the magazine and attaches the holder and transmitter to a machine spindle. The machine spindle is then used to activate an alarm button on the transmitter. At this time, a radio frequency signal or RF signal from the transmitter is sent to a portable receiver. The portable receiver is placed outside the milling machine and disposed near a machine operator. At this time, the operator is alerted that the milling machine has stopped operating and needs to be attended, thus increasing the productivity of both the machine and the operator.

These and other objects of the present invention will become apparent to those familiar with the various types of machine tool alarm devices and systems when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the subject milling machine alarm system, and in which.

DETAILED DESCRIPTION OF THE PREFERRED EMBODIMENTS

Figure 1:
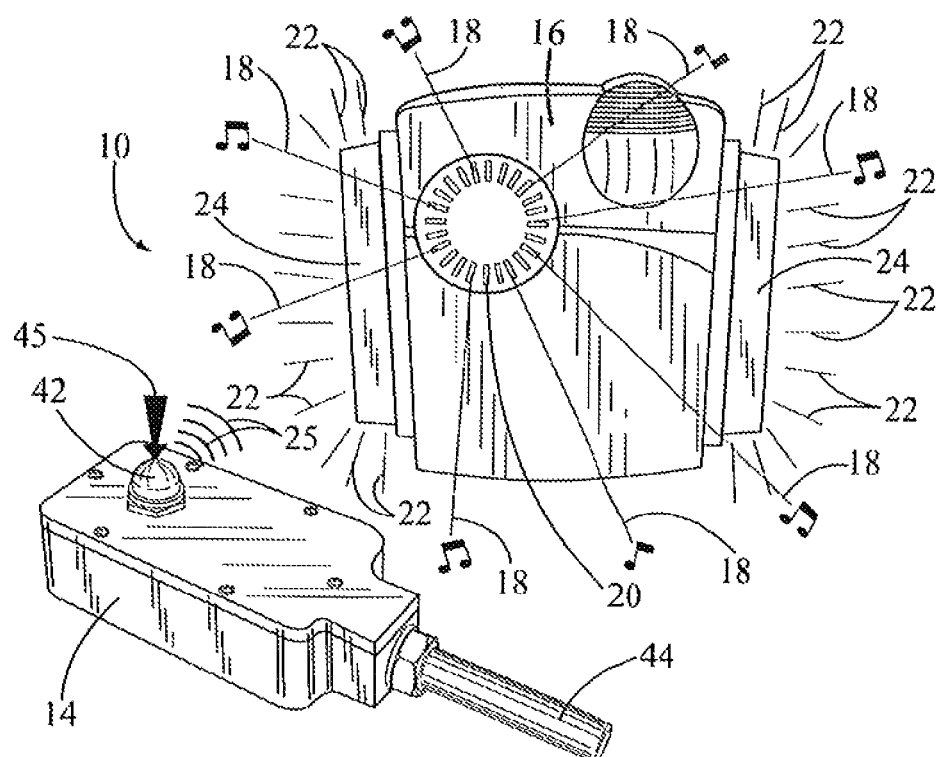
FIG. 1 is a perspective view of the subject portable alarm system. This system includes a portable radio frequency (RF) transmitter adapted for mounting inside a CNC milling machine for sending a radio signal to a portable receiver disposed outside the milling machine.
Figure 2:
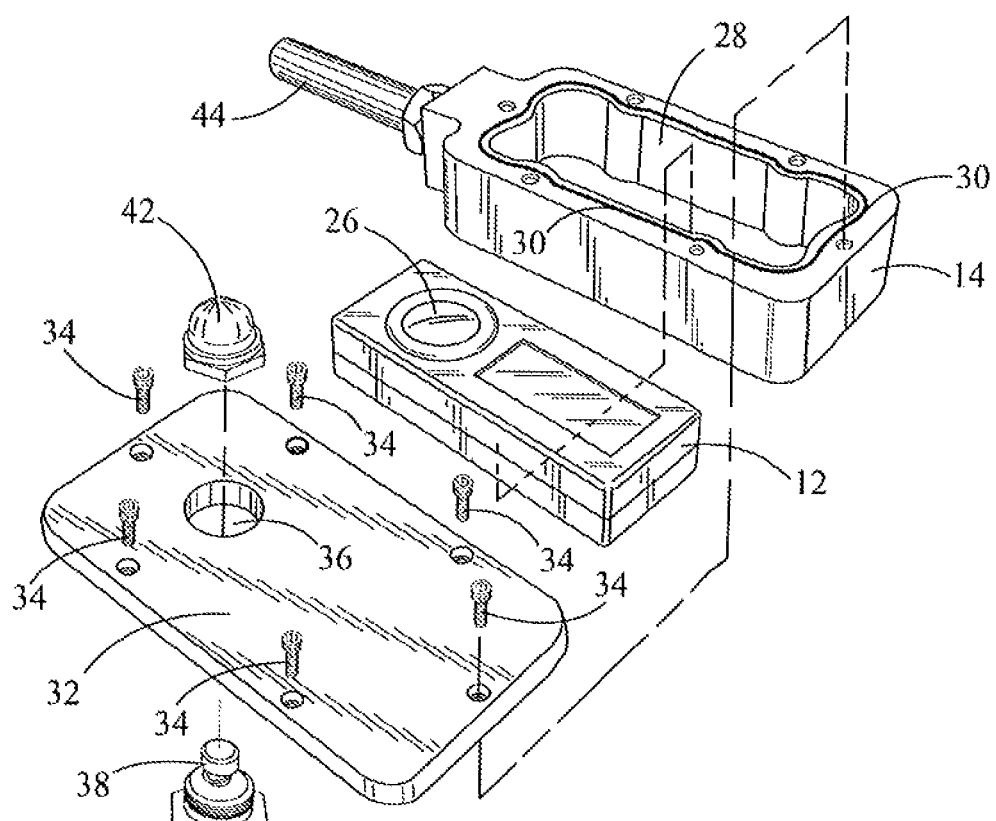
FIG. 2 is an exploded perspective view of the transmitter and a waterproof housing for receiving the transmitter therein.

In FIG. 1, a perspective view of the subject portable alarm system is shown having a general reference numeral 10. The system 10 includes a portable, battery operated, radio frequency (RF) transmitter 12 mounted inside a watertight housing 14. The transmitter 12 is shown in FIG. 2. The transmitter 12 and the housing 14 are adapted for mounting inside a CNC milling machine used for milling a variety of work pieces. The complete CNC milling machine is not shown in the drawings.

The system 10 also includes a portable, battery operated receiver 16. The receiver 16 includes an alarm in the form of a sound, shown as musical notes 18 from a speaker 20, or an alarm in the form of flashing lights, shown as lines 22, from light housings 24 or a combination of both sound and light emitted from the receiver. The portable receiver 16 is disposed outside the milling machine and next to an operator's work station or a common location between milling machines for receiving a radio signal, shown as lines 25, from the transmitter 12 and sounding the alarm. The receiver 16 can be placed outside the CNC milling machine to a distance of 10 to 100 feet and greater.

Figure 3:
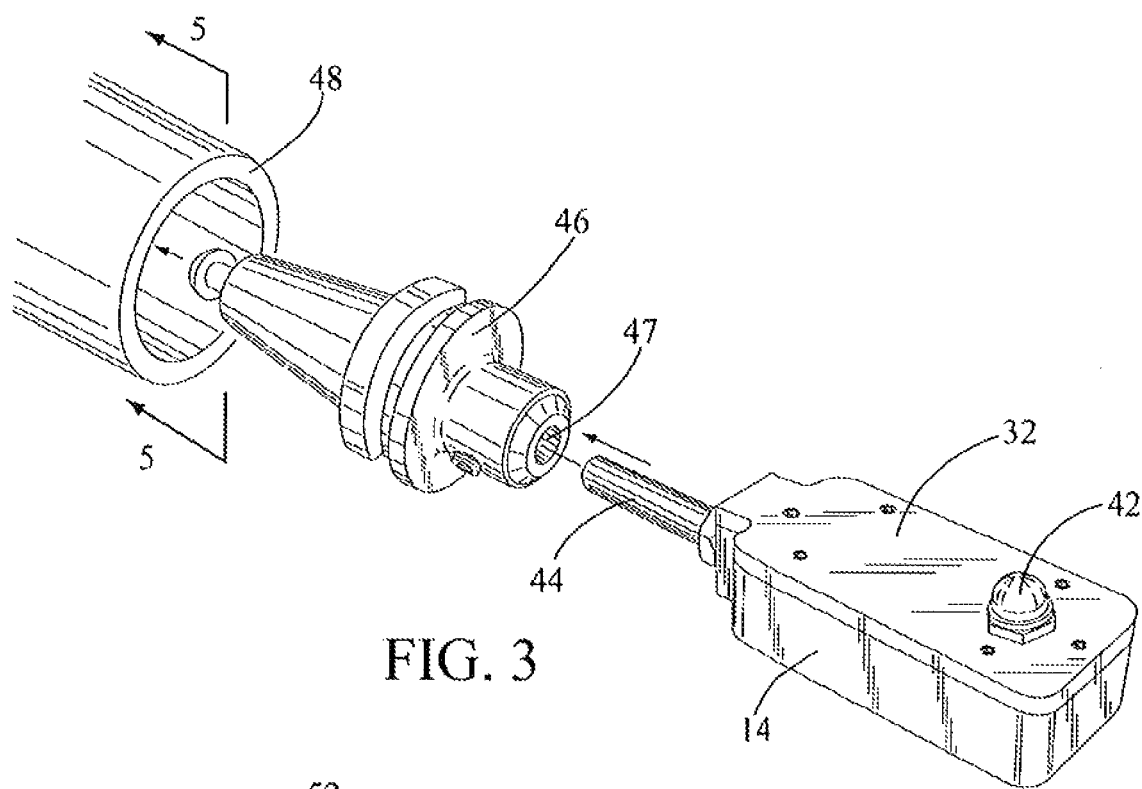
FIG. 3 is a perspective view of a shank attached to one end of the waterproof housing and positioned for receipt in one end of a tool holder. An opposite end of the tool holder is positioned for receipt in a tool holder pot. The tool holder pot is part of a plurality of pots disposed on a tool holder magazine.

In FIG. 2, an exploded perspective view of the transmitter 12 and housing 14 are shown with a radio signal button 26 for sending an RF signal. In this drawing, the watertight housing 14 is shown with a transmitter cavity 28 for receiving the transmitter 12 therein. Disposed next to the upper side of the cavity 28 is an "O" ring 30 for providing a water tight seal when a housing cover plate 32 is secured to the top of the housing 14 using threaded screws 34. The cover plate 32 includes a plunger opening 36 for receiving an upper end of a plunger 38 therethrough. The plunger 38 is mounted on an actuator 40, which is received on top of the radio signal button 26. A lower end of the plunger 38 is disposed above the button 26. The plunger 38 is covered with a flexible, watertight push button boot 42 to prevent any liquid or moisture from any splashing cutting fluid entering inside the housing 14. The housing 14 also includes a round, tool holder shank 44 extending outwardly from one side thereof and used for receipt in one end of a tool holder 46. The tool holder 46 is shown in FIG. 3. It should be mentioned, the tool holder 46 is a standard tool holder for holding a variety of cutting tools and drills in a CNC milling machine.

Referring now to both FIGS. 1 and 2, when the plunger cover 42 and the plunger 38 are depressed, as indicated by arrow 45, the plunger 38 moves inside the actuator 40 and the lower end of the plunger presses against a top of the radio signal button 26, thus activating the transmitter 12 and sending the radio signal 25 outwardly to the remote transmitter 16.

In FIG. 3, a perspective view of the tool holder shank 44 is shown and positioned for receipt in a hole 47 in one end of the tool holder 46, as mentioned above. An opposite end of the tool holder 46 is positioned for receipt in a tool holder pot 48. The tool holder pot 48 is part of a plurality of pots mounted on a circular tool holder magazine 50, shown in FIG. 5.

Figure 4:
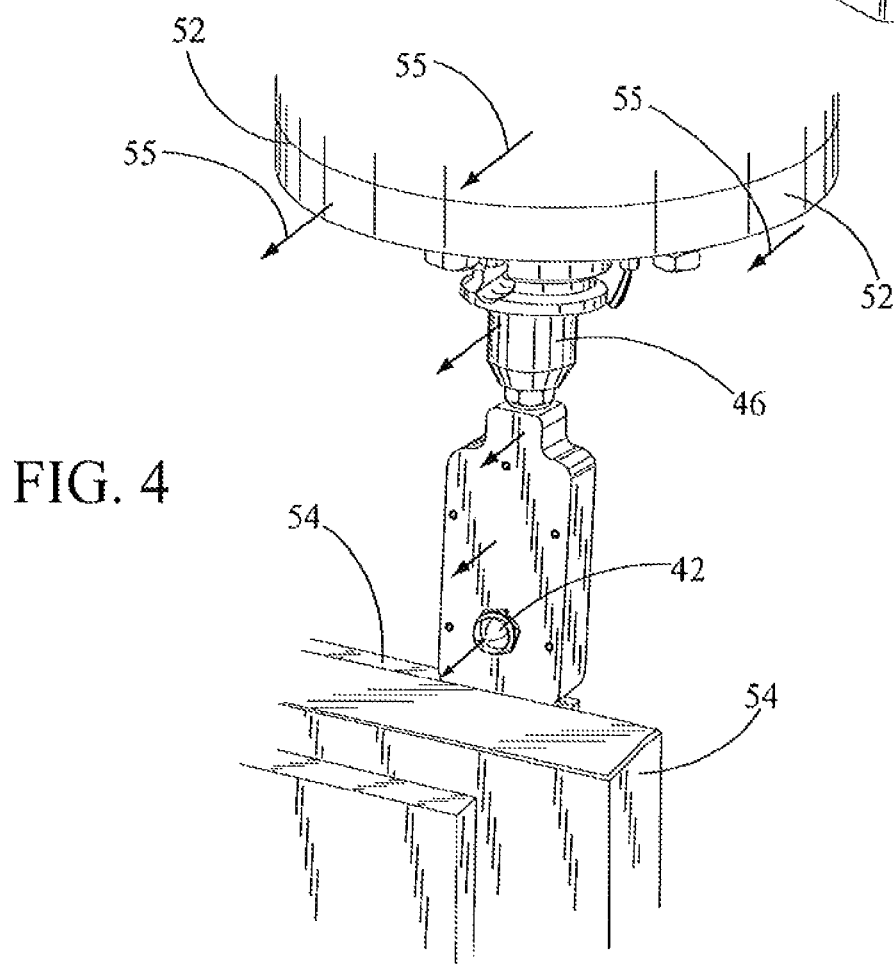
FIG. 4 is a perspective view of the machine spindle holding the tool holder with transmitter housing thereon and positioned for activating the transmitter and sending a radio signal to the receiver.

In FIG. 4, a perspective view of a machine spindle 52 is shown holding the tool holder 46 with the transmitter 12 held inside the housing 14. When the machining of the work piece is completed, the CNC machine tool is programmed to activate an automatic tool changer to remove the transmitter housing 14 and the tool holder 46 from the tool magazine 50 to the spindle 52. The automatic tool changer is not shown in the drawings. At this time, spindle 52 is used to move the transmitter housing 14, as indicated by arrows 55, against a portion of the inside of the milling machine or a work piece 54 and press the push button boot 42 and plunger 38. The plunger 38 then presses against the radio signal button 26, thus sending the radio signal 25 front the transmitter 12 to the receiver 16 for sounding the alarm.

Figure 5:
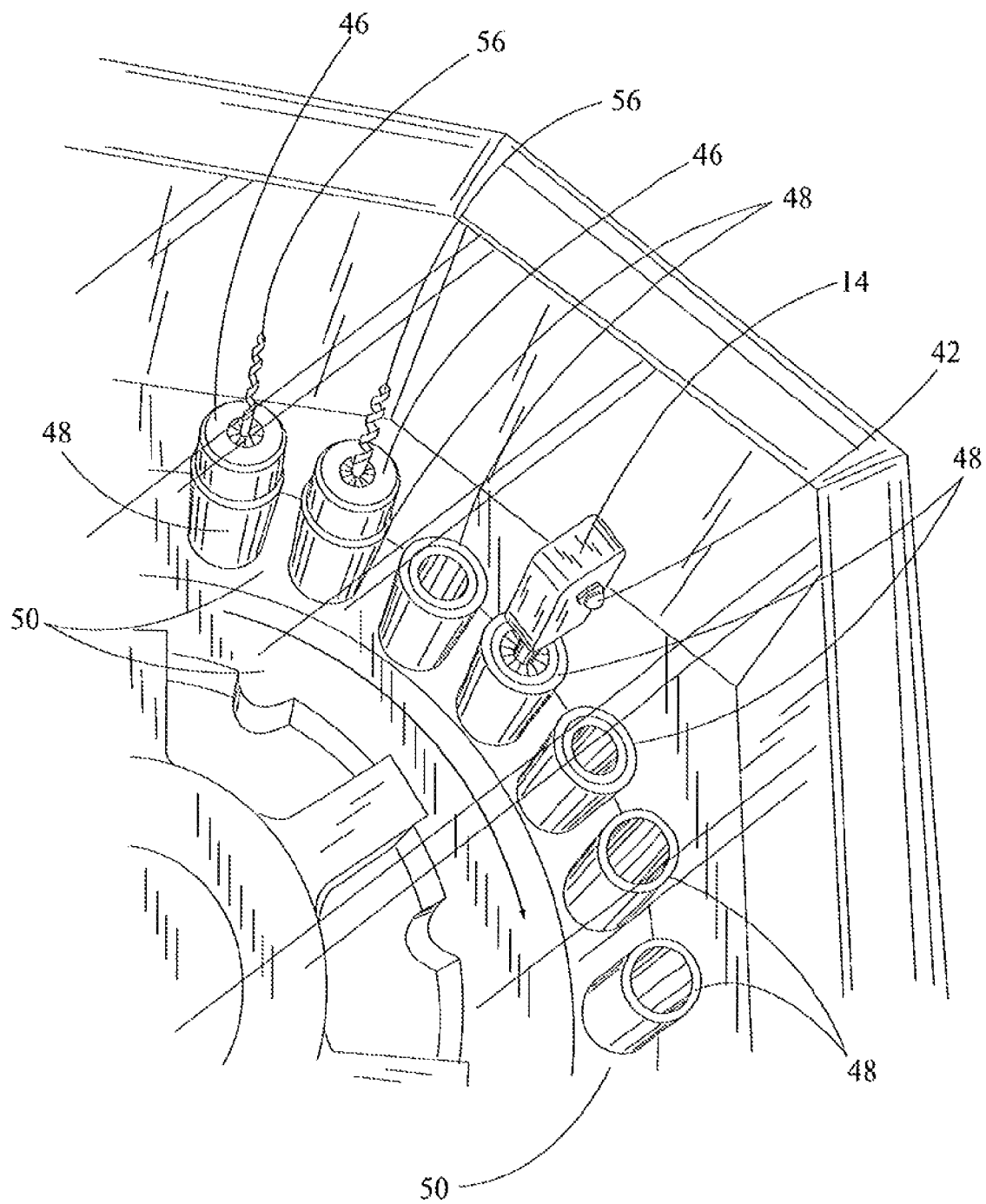
FIG. 5 is a perspective view of a portion of the tool holder magazine and illustrating the transmitter housing with tool holder received in a selected pot on the magazine prior to an automatic tool changer transferring the housing and tool holder to the tool spindle.

In FIG. 5, a perspective view of a portion of the tool holder magazine 50 is shown and illustrating the housing 14, with transmitter 12 therein, and the tool holder 46 received in a selected pot 48 and prior to being removed by the automatic tool changer. In this drawings, a number of pots 48 are shown with tool holders 46 holding different machine tool drills 56.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An alarm system used with a CNC milling machine for alerting an operator of the machine that a work cycle has been completed on a workpiece, the milling machine including a tool holder, a tool holder magazine for storing one or more tool holders, an automatic tool changer, and a tool spindle, the tool spindle used in milling the work piece, the alarm system comprising:
    a portable, battery powered transmitter with a radio signal button, the radio signal button, when pressed inwardly, actuating the transmitter and sending a radio signal outwardly from the milling machine;
    a watertight transmitter housing for receiving the transmitter therein,
    a tool holder shank attached to and extending outwardly from one side of the transmitter housing, the shank adapted for receipt on the tool holder, the tool holder holding the transmitter and transmitter housing inside the milling machine; and
    a portable, battery powered receiver having an alarm thereon, the portable receiver disposed outside the milling machine, the receiver sounding an alarm when receiving the radio signal from the transmitter and alerting the operator.

2. The alarm system as described in claim 1 wherein the receiver includes an audio alarm for providing an alarm sound when the receiver receives the radio signal from the transmitter inside the milling machine.

3. The alarm system as described in claim 1 wherein the receiver includes a visual alarm for providing an alarm light when the receiver receives the radio signal from the transmitter inside the milling machine.

4. The alarm system as described in claim 1 wherein the receiver includes a combination of audio alarm and a visual alarm for providing an alarm sound and an alarm light when receiving the radio signal from the transmitter inside the milling machine.

5. An alarm system used with a CNC milling machine, the milling machine including a tool holder, a tool holder magazine for storing one or more tool holders, an automatic tool changer, and a machine spindle, the machine spindle used in milling a work piece, the alarm system comprising;
    a portable, battery powered transmitter with a radio signal button;
    an actuator with a plunger mounted on the transmitter, a lower end of the plunger disposed on top of the radio signal button;
    a watertight transmitter housing for receiving the transmitter therein, the housing having a plunger opening for receiving an upper end of the plunger therethrough, when the plunger is pressed downwardly, the lower end of the plunger contacts the button and the button actuates the transmitter for sending a radio signal outwardly from the milling machine;
    a round tool holder shank attached to and extending outwardly from one side of the transmitter housing, the shank adapted for receipt in one end of the tool holder, the tool holder holding the transmitter and transmitter housing inside the milling machine; and
    a portable, battery powered receiver having an alarm thereon, the portable receiver disposed outside the milling machine, the receiver sounding an alarm when receiving a radio signal from the transmitter.

6. The alarm system as described in claim 5 wherein the transmitter housing includes a cavity for receiving the transmitter and a cover plate attached to the housing for holding the transmitter inside the cavity, the cover plate including the plunger opening for receiving the upper end of the plunger therethrough.

7. The alarm system as described in claim 6 further including a flexible, watertight push button boot disposed over the upper end of the plunger and attached to the actuator.

8. The alarm system as described in claim 5 wherein the receiver includes an audio alarm for providing an alarm sound when the receiver receives the radio signal from the transmitter inside the milling machine and at a distance up to 100 feet and greater from the milling machine.

9. The alarm system as described in claim 5 wherein the receiver includes a visual alarm for providing an alarm light when the received receives the radio signal from the transmitter inside the milling machine and at a distance up to 100 feet and greater from the milling machine.

10. The alarm system as described in claim 5 wherein the receiver includes a combination of audio alarm and a visual alarm for providing an alarm sound and an alarm light when receiving the radio signal from the transmitter inside the milling machine and at a distance up to 100 feet and greater from the milling machine.

11. An alarm system used with a CNC milling machine for alerting an operator of the machine that a work cycle has been completed on a work piece, the milling machine including a tool holder, a tool holder magazine for storing one or more tool holders, an automatic tool changer, and a tool spindle, the tool spindle used in milling the work piece, the alarm system comprising:
   a portable, battery powered, transmitter with a radio signal button, the radio signal button, when pressed inwardly, actuating the transmitter and sending a radio signal outwardly from the milling machine;
   a watertight transmitter housing for receiving the transmitter therein,
   a round tool holder shank attached to and extending outwardly from one side of tire transmitter housing, the shank adapted for receipt on the tool holder, the tool holder holding the transmitter and transmitter housing inside the milling machine;
   a portable, battery powered receiver having an audio alarm thereon, the portable receiver disposed outside the milling machine, the receiver sounding the audio alarm when receiving the radio signal from the transmitter and alerting the operator.

12. The alarm system as described in claim 11 wherein the receiver includes a combination of the audio alarm and a visual alarm for providing the alarm sound and an alarm light when receiving the radio signal from the transmitter inside the milling machine.

13. The alarm system as described in claim 11 further including an actuator with a plunger mounted on the transmitter, a lower end of the plunger disposed on top of the radio signal button, when the plunger is pressed, the lower end of the plunger contacts the button and the button actuates the transmitter for sending a radio signal outwardly from the milling machine.

14. The alarm system as described in claim 13 wherein the transmitter housing includes a cavity for receiving the transmitter and a cover plate attached to the housing for holding the transmitter inside the cavity, the cover plate including the plunger opening for receiving the upper end of the plunger therethrough.

15. The alarm system as described in claim 14 further including a flexible, watertight push button boot disposed over the upper end of the plunger and attached to the actuator.

\* \* \* \* \*